F. SCOGNAMILLO.
PNEUMATIC TIRE FENDER.
APPLICATION FILED NOV. 9, 1917.
1,266,866.
Patented May 21, 1918.
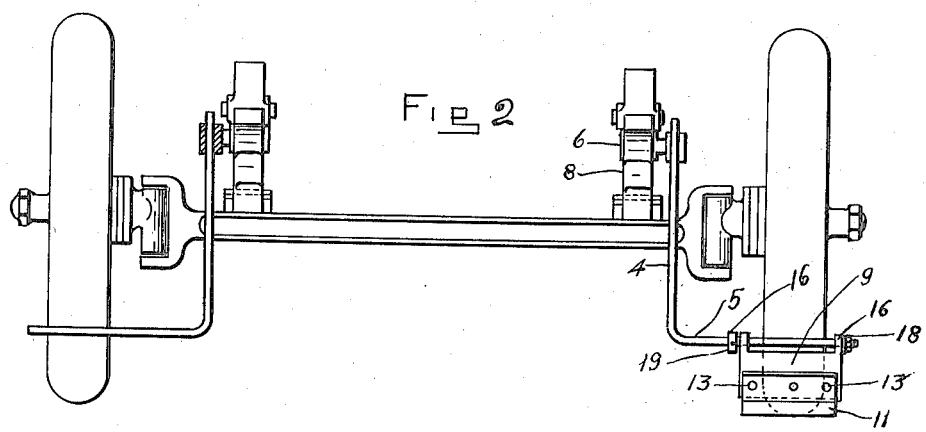
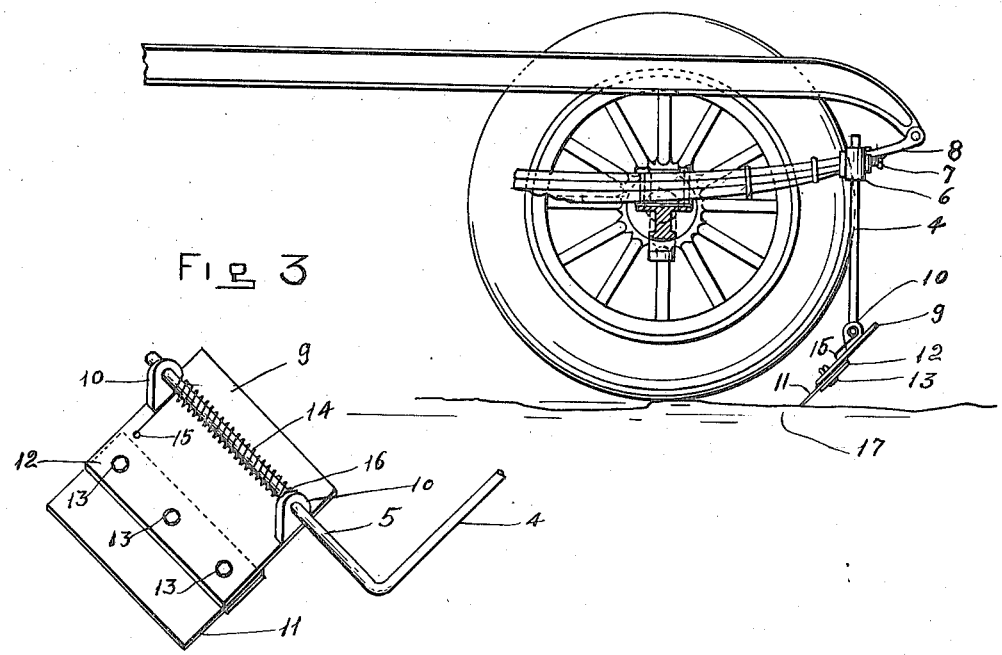

UNITED STATES PATENT OFFICE.

FRANCIS SCOGNAMILLO, OF NEW YORK, N. Y.

PNEUMATIC-TIRE FENDER.

1,266,866.

Specification of Letters Patent.

Patented May 21, 1918.

Application filed November 9, 1917. Serial No. 201,064.

*To all whom it may concern:*

Be it known that I, FRANCIS SCOGNAMILLO, a citizen of the United States, residing at New York, in the county of Bronx and State of New York, have invented new and useful Improvements in Pneumatic-Tire Fenders, of which the following is a specification.

This invention relates to pneumatic-tire fenders for automobiles and other vehicles, and the object of this invention is to provide a device composed of several parts and which can suitably be attached to the foremost part of an automobile or vehicle, and by means of its construction said device or fender being readily adjustable and attached to its pre-determined position and projecting advanced from the front wheels or tires of an automobile, and the said fender carrying a detachable flexible strip of any suitable material such as leather or canvas, which is permanently kept in contact to the ground, which thereby causes to sweep aside all fragments injurious to the vehicle pneumatic-tires while traveling.

With these objects and advantages in view, the invention consists mainly in its preferred method of application together with its construction and arrangement of parts which will be more fully hereinafter described and claimed.

In the drawing:

Figure 1 is a side elevation of the fender, showing the same attached to the forward springs of a vehicle.

Fig. 2 is a front view elevation of the fender showing its position in advance of the pneumatic-tire.

Fig. 3 is a back view of the fender-proper, with rod broken away showing detachable strip and details.

The numeral 4 designates a rod with a portion of one end bent in right angle 5, and having its opposite end securely held to a clamp 6 by a set screw 7, the clamp 6 as shown is positively secured to the foremost portion of the vehicle elliptic spring 8.

Loosely mounted on the angular portion of the rod as per numeral 5 is a rectangular plate or fender proper 9, with lugs 10, a detachable flexible strip 11 is secured to the lower end of the plate 9 by means of a metal strip 12 and bolts 13, as will be seen the major portion of the detachable flexible strip 11 protrudes out from the edge of the lower end of the plate 9. The spring 14 placed between the lugs 10 of the plate 9 and the angular portion of the rod numeral 5 having one end secured to the plate 9 which is shown by the numeral 15 and its opposite end 16 secured to the angular portion of the rod numeral 5. The purpose of the spring 14 is to bear to the plate 9 a continuous pressure toward the ground, and which eventually maintains the detachable flexible strip 11 in permanent contact to the ground causing to sweep aside during the vehicle's travels all such fragments of materials which would cause punctures or other injurious effects to the pneumatic-tire, the angular position of the plate or fender 9 together with the detachable flexible strip 11 against the ground 17 will be clearly discernible in Fig. 1 of the drawing. The numeral 18 is a threaded nut which keeps the fender or plate 9 from slipping out and into normal position on the angular portion of the rod numeral 5 against a collar 19.

What is claimed is:

A pneumatic-tire fender, of the class described and for the purpose set forth, comprising a rod bent in right angle on one end, the upright longer portion of said rod having suitable clamps and attached to the foremost forward part of the elliptic springs of a vehicle or automobile, and the angle portion of same being advanced in front of the forward pneumatic tire wheels and carrying a swivel plate having a detachable flexible strip, which is continually kept in contact to the ground by means of a spring.

In testimony whereof I have hereunto set my hand in presence of two subscribing witnesses.

FRANCIS SCOGNAMILLO.

Witnesses:
 CATO NOVELHUE,
 LEO DE PACK.